United States Patent Office 3,110,571
Patented Nov. 12, 1963

3,110,571
CERAMIC MATERIAL BONDED TO METAL HAVING REFRACTORY OXIDE DISPERSED THEREIN
Guy B. Alexander, Brandywine Hundred, Del., assignor to E. I. du Pont de Nemours and Company, Wilmington, Del., a corporation of Delaware
No Drawing. Filed July 1, 1958, Ser. No. 745,812
8 Claims. (Cl. 29—195)

This invention relates to improving the strength, especially at very high temperatures, of metal-bonded ceramics, and is more particularly directed to producing improved products by dispersing in a bonding metal a particulate refractory metal oxide insoluble therein, the bonding metal being one which has an oxide with a free energy of formation at 27° C. greater than 75 kilocalories per gram atom of oxygen in the oxide, and the particulate refractory oxide having a free energy of formation greater than that of said bonding metal oxide, a melting point higher than that of the bonding metal, and being in the form of substantially discrete particles 5 to 500 millimicrons in size, effecting contact between the refractory oxide-filled bonding metal, in the molten state, and a ceramic material having a surface area less than $6/d$ square meters per gram, $d$ being the density of the ceramic in grams per milliliter, and solidifying the metal while maintaining such contact. The invention is further directed to the improved articles so produced.

The metal-bonded ceramic materials known as cermets gave great promise of being a complete answer to need for materials of construction suitable for use at extremely high temperatures. It soon became apparent, however, that these materials were inherently deficient in impact strength. They were so brittle that the ordinary impacts which were unavoidable in service caused them to break to pieces and hence, to be unreliable in service. Efforts to decrease the brittleness by properly selecting the bonding metal and increasing its proportion failed to solve the problem because if the proportion of metal was sufficient to avoid brittleness, it was at the same time sufficient to give rise to a new problem—namely, an unduly high degree of high-temperature creep. The modified compositions would show dimensional instability and could not be used for operational construction involving close clearances.

The result has been that no cermet heretofore has had both adequate impact strength and resistance to high-temperature creep. The problem has been clearly recognized, but no way of solving it has heretofore been known.

In other situations also, where the problem has been to bond a ceramic through metal, as in the case of joining glass to metal parts, the strength of the bond obtainable has left much to be desired, especially under high-temperature service. Various approaches have been suggested, mostly along the line of finding a suitable combination of bonding metals to meet the specific requirement of the particular ceramic and metal part involved, but even where improvement has been effected in this way, a still further improvement would be highly advantageous.

Now according to the present invention it has been found that stronger cermets and better bonds between ceramics and metals can be made by processes in which there is dispersed in the bonding metal extremely small particles of a refractory metal oxide, the bonding metal, the refractory oxide, and the ceramic material bonded being so selected with respect to each other as to be stable, both physically and chemically, at very high temperatures. The bonding is achieved by effecting contact between the refractory-filled bonding metal and the ceramic material while the metal is molten at least at the interface between the metal and the ceramic, and solidifying the metal while maintaining such contact.

The novel articles produced by the processes just described exhibit very little creep, even at very high temperatures of service, and have greater impact strength than similar compositions containing no such dispersed refractory oxide.

For convenience in describing this invention, certain terminology and abbreviations will be used. Free energy of formation will be kilocalories per gram atom of oxygen in the oxide, as determined at 27° C. unless otherwise specified, and will be called $\Delta F$. The metals which have an oxide having a $\Delta F$ of more than 75 will be referred to as "bonding" metals. Surface areas of the refractory oxides and of the ceramics will be square meters per gram, and particle diameters will be millimicrons, abbreviated $m\mu$. The particulate refractory oxide will sometimes be referred to as the filler.

*The Ceramic Material*

The term "ceramic" is used herein in its usual and ordinary meaning to cover all of the inorganic, non-metallic materials prepared by the use of heat. Put another way, they are materials indestructible by the action of heat.

In his book "Ceramics," vol. 1, Pennsylvania State College, 1952, at page 2 of the first chapter, E. P. McNamara has said: "In its modern sense, the ceramic industry may be said to encompass the following branches: white wear or pottery, heavy clay products, refractories, abrasives, glass, enamels, and cements. . ." All of these products are among the ceramics which can be bonded according to the present invention.

In a preferred aspect of the invention, the ceramic materials used are those which are not easily sintered or deformed when heated with the metal-refractory bonder. The sintering characteristics of any ceramic material can be determined by surface area; the lower the surface area, the less the sintering tendency.

In general, when ceramic particles are a micron or larger in size, the sintering characteristics change very little with further size increase. Size can be conveniently expressed in terms of surface area. For the purposes of this invention, ceramic materials which have a surface area of less than $6/d$ square meters per gram are used, $d$ being the density of the ceramic in grams per milliliter. Such ceramic materials are in the larger-than-micron size range, and hence are resistant to sintering during the process of bonding the refractory with the bonder metal containing the dispersed refractory oxide.

In aspects of the invention where the ceramic is in powder form, as in the production of cermets, the surface area of the ceramic particles approaches the limit of $6/d$ square meters per gram. However, the ceramic can also be in massive form—that is, large ceramic objects can be bonded. Window glass can be bonded to metal. This is particularly useful in making double-paned windows with a sealed air space between the panes. The ceramic can be in useful shapes, such as electronic tubes wherein the bonds between the wires and the glass tube are improved according to the invention.

Chemically, the ceramic can consist of a metalloid, a refractory metal oxide, or a silicate. Thus, the ceramic may consist chemically of the same refractory oxide which is dispersed in the bonding metal, but the ceramic portion of the composition will be sufficiently massive that the surface area is greater than $6/d$ square meters per gram.

Among the suitable metalloids are the carbides of metals such as the carbides of titanium, silicon, zirconium, manganese, boron, vanadium, or iron; the nitrides including those of vanadium, titanium, magnesium, or aluminum; silicides as, for example, those of molybdenum, manganese, iron, nickel, vanadium, cobalt, or magnesium; or the borides of such metals as chromium, iron, cobalt, or silicon.

Among the massive metal oxides which are often used as ceramics are silica flour or finely divided quartz, zirconia, zircon, thoria, alumina, titania, magnesia, and calcium oxide. Among the silicate ceramics are asbestos, clays, mica, exfoliated vermiculite, fiber glass, porcelain, and similar synthetic or naturally occurring materials.

The Bonding Metal

The bonding metal with which the ceramic is joined in processes and articles of this invention is a metal having an oxide which has a $\Delta F$ at 27° C. above 75 kilocalories per gram atom of oxygen in the oxide. In this group are metals whose oxides cannot be reduced by hydrogen at all or only with greatest difficulty.

More particularly, the metals in the following table are useful as bonding metals:

| Bonding Metal | Oxide | $\Delta F$ of Oxide at 27° C. |
|---|---|---|
| Aluminum | $Al_2O_3$ | 126 |
| Barium | $BaO$ | 126 |
| Beryllium | $BeO$ | 140 |
| Calcium | $CaO$ | 144 |
| Chromium | $Cr_2O_3$ | 83 |
| Hafnium | $HfO_2$ | 126 |
| Potassium | $K_2O$ | 77 |
| Lanthanum | $La_2O_3$ | 137 |
| Lithium | $Li_2O$ | 134 |
| Magnesium | $MgO$ | 136 |
| Manganese | $MnO$ | 87 |
| Sodium | $Na_2O$ | 93 |
| Niobium | $NbO_2$ | 90 |
| Scandium | $Sc_2O_3$ | 140 |
| Silicon | $SiO_2$ | 98 |
| Strontium | $SrO$ | 133 |
| Tantalum | $Ta_2O_5$ | 92 |
| Thorium | $ThO_2$ | 140 |
| Titanium | $TiO_2$ | 103 |
| Vanadium | $VO$ | 99 |
| Yttrium | $Y_2O_3$ | 143 |
| Zinc | $ZnO$ | 76 |
| Zirconium | $ZrO_2$ | 123 |

The figures for $\Delta F$ in the above table refer to the value per gram atom of oxygen in the oxide. Thus, $\Delta F$ for $Al_2O_3$ is 378 kilocalories per mol. There are 3 oxygen atoms in one mol; hence $\Delta F$ for ⅓ $Al_2O_3$ is 126.

While only lanthanum and thorium from the rare earth metals group are included in the foregoing table it will be understood that the other rare earth metals are similar and all the rare earth metals—that is, those having atomic numbers of 58 to 71 and above 90 are included as bonding metals. However, those with atomic numbers above 90 are not preferred, because they are radioactive.

Although the alkali metals and alkaline earth metals are included in the foregoing tabulation of bonding metals, they suffer from the disadvantage that they are volatile. A preferred class of bonding metals includes those having a boiling point above 1700° C. In this preferred class are chromium, aluminum, lanthanum, manganese, silicon, titanium, thorium, vanadium, yttrium, zirconium, and niobium. Chromium and titanium are especially preferred.

It will be understood, of course, that the bonding metal may comprise more than one of the metals included in the foregoing tabulation and may also include, in addition, metals which have an oxide with a $\Delta F$ lower than 75 kilocalories per gram atom of oxygen in the oxide. Thus, the bonding metal can be an alloy or a pure metal. Actually, with the higher melting bonding metals, it is often advantageous to include an alloying metal of lower melting point.

Among the non-bonding metals which can be included with the bonding metal are iron, cobalt, nickel copper, cadmium, thallium, germanium, tin, lead, antimony, bismuth, molybdenum, tungsten, rhenium, indium, silver, gold, ruthenium, rhodium, palladium, osmium, and platinum.

The Particulate Refractory Oxide

The bonding metal in the processes and articles of this invention is modified by the dispersion therein of an insoluble particulate refractory metal oxide which has a free energy of formation greater than that of an oxide of the bonding metal. The refractory oxide is in the form of substantially discrete particles having an average dimension of 5 to 500 millimicrons. The melting point of the refractory oxide particles is higher than that of the bonding metal.

If the bonding metal is titanium, for instance, it will be seen from the foregoing tabulation that the oxide, $TiO_2$, has a $\Delta F$ at 27° C. of 103 kilocalories. Thus, the refractory oxide used with titanium should have a $\Delta F$ at 27° C. greater than 103 kilocalories. Alumina, $Al_2O_3$, has a $\Delta F$ of 126 kilocalories and hence is suitable.

The refractory metal oxide itself can be used as the starting material or it can be formed during the process by heating another metal-oxygen-containing material. The metal-oxygen-containing material can, for example, be selected from the group consisting of oxides, carbonates, oxylates, and in general, combinations which, after heating to constant weight at 1500° C., are refractory metal oxides.

Irrespective of the properties of the materials so heated, such formation of the refractory oxide in situ is applicable provided the metal oxide ultimately found has the requisite properties above indicated.

The refractory can be a mixed oxide, particularly one in which each oxide has the melting point and $\Delta F$ characteristics required. Thus, magnesium silicate, $MgSiO_3$, is a mixed oxide of $MgO$ and $SiO_2$. For bonding metals with which each of these oxides can be used separately, the products of reaction with each other are also useful. Thus, the refractory oxide is a single metal oxide or a reaction product of two or more metal oxides; also two or more separate oxides can be used. Broadly, the term "refractory metal oxide" includes spinels, such as $MgAl_2O_4$ and $ZnAl_2O_4$, metal carbonates, such as $BaCO_3$, metal aluminates, metal silicates such as magnesium silicate and zircon, metal titanates, metal vanadates, metal chromites, and metal zirconates. With specific reference to silicates, for example, one can use complex structures, such as sodium aluminum silicate, calcium aluminum silicate, calcium magnesium silicate, calcium chromium silicate, and calcium silicate titanate.

Some typical single oxide fillers are silica, alumina, zirconia, titania, magnesia, hafnia, and the rare earth oxides including didymium oxide and thoria. A typical group of suitable oxides, and their free energies of formation is shown below:

| Oxide | $\Delta F$ at 27° C. | Oxide | $\Delta F$ at 27° C. |
|---|---|---|---|
| $Y_2O_3$ | 143 | $ZrO_2$ | 123 |
| $CaO$ | 144 | $BaO$ | 126 |
| $La_2O_3$ | 137 | $TiO_2$ | 103 |
| $BeO$ | 140 | $SiO_2$ | 98 |
| $ThO_2$ | 140 | $Ta_2O_5$ | 92 |
| $MgO$ | 136 | $NbO_2$ | 90 |
| $HfO_2$ | 126 | $Cr_2O_3$ | 83 |
| $Al_2O_3$ | 126 | | |

The refractory oxide must be in a finely divided state. The substantially discrete particles should have an average dimension in the size range from 5 to 500 m$\mu$, with a minimum of 10 m$\mu$ being even more preferred. (Note that 250 m$\mu$ particles have a surface area of $25/D$ and 10 m$\mu$ of $600/D$.)

The particles should be dense and anhydrous for best results, but aggregates of smaller particles can be used, provided the discrete particles of aggregate have the above-mentioned dimensions. Particles which are substantially spheroidal or cubical in shape are also preferred, although anisotropic particles such as fibers or platelets can be used for special effects.

The size of a particle is given as an average dimension. For spherical particles all three dimensions are equal and the same as the average. For anisotropic particles the size is considered to be one third of the sum of the three particle dimensions. For example, a fiber of asbestos might be 500 m$\mu$ long but only 10 m$\mu$ wide and thick. The size of this particle is $$\frac{500+10+10}{3}$$

or 173 m$\mu$, and hence within the limits of this invention.

Colloidal metal oxide aquasols are particular useful as a means of providing the refractory oxides in the desired finely divided form and hence are preferred. For example, silica aquasols such as described in Bechtold et al. U.S. Patent 2,574,902, Alexander U.S. Patent 2,750,345, and Rule U.S. Patent 2,577,485 are suitable as starting materials. Zirconia sols are likewise useful. The art is familiar with titania sols, and such sols as described by Weiser in "Inorganic Colloidal Chemistry," volume 2, "Hydrous Oxides and Hydroxides," for example, can be used.

Although they are less preferred, aerogels and reticulated powders can also be used. For example, products described in Alexander et al. U.S. Patent 2,731,326, can be employed. In these instances it is necessary that the aggregate structures be broken down to particles in the size range specified.

Powders prepared by burning metal chlorides, as, for example, by burning silicon tetrachloride, titanium tetrachloride, or zirconium tetrachloride to produce a corresponding oxide, are also very useful if the oxides are obtained primarily as discrete, individual particles, or aggregated structures which can be dispersed to such particles.

Calcium oxide is a particularly preferred refractory oxide. Since it is water-soluble or, more accurately, water-reactive, one cannot obtain it as an aqueous dispersion in the colloidal state. In this instance, one can use an insoluble calcium compound, such as the carbonate or oxalate, which on heating, will decompose to the oxide. Thus, for example, particles of finely divided calcium carbonate can be coated with an oxide of the bonding metal in which it is to be dispersed, e.g., hydrous chromium oxide, by treating a dispersion of finely divided calcium carbonate with a base and a salt of the metal e.g., chromic nitrate and sodium carbonate. On heating the precipitate and reducing, a dispersion of calcium oxide in chromium is obtained. Similarly, one can obtain dispersions of barium oxide, strontium oxide, or magnesia in the metal being treated.

Whatever method is selected for preparing the refractory oxide should give a product having the ultimate particle size as above stated, and preferably also having a surface area, in square meters per gram, of from 12/$D$ to 1200/$D$, where $D$ is the density of the particles in grams per milliliter. For instance, thoria particles have a density of 9.7 grams per milliliter; hence when thoria is used it should have a surface area of from 1.2 to 124 square meters per gram.

The refractory oxide must be one which is relatively insoluble in the bonding metal in which it is to be used. If the oxide dissolved, it would, of course, lose its necessary physical characteristics and become valueless for its intended use.

The particular refractory oxide selected for use with a bonding metal should be one which is insoluble in that metal. The solubility can vary somewhat, depending upon the system involved, but in general should not be greater than about .25 percent by weight.

*Dispersing the Refractory Oxide in the Bonding Metal*

In describing the processes of this invention, the dispersed refractory oxide will hereinafter be referred to as the "filler," even though it is an essential element of the novel processes and products.

In carrying out a process of the invention, having selected a refractory oxide filler and a bonding metal as above described, one surrounds the filler particles with the bonding metal while maintaining the filler as separate particles. The method used must be one which will not cause the particles to agglomerate or to grow to a size outside the stated range—that is, larger than ½ micron.

When the bonder metal is one having a relatively low melting point, such as calcium, and the refractory oxide filler is one having a relatively high $\Delta F$ at 27° C., the filler-bonding metal dispersion can be prepared merely by stirring the filler into the molten metal, the temperature of the mixture being only slightly above the melting point of the metal. While such products have utility for bonding ceramics, the utility of the bonded ceramics is usually quite limited and hence other methods hereinafter described are preferred.

When the bonder metal has a very high melting point, or is one having an oxide with a $\Delta F$ only slightly less than that of the refractory oxide filler, especial precautions must be taken to avoid agglomeration of the filler particles during dispersion in the bonder metal. Accordingly, it is preferred to use methods wherein the bonder metal is actually formed around the pre-formed filler particles. This can be done, for instance, by coprecipitating the filler as discrete particles in the desired size range together with a compound of the bonder metal in oxidized form, and subsequently reducing the bonder metal compound to the metallic form. Such processes and the compositions formed are described and claimed in the U.S. application Serial No. 744,930, filed June 27, 1958, by Guy B. Alexander and Paul C. Yates and assigned to the assignee of this application, now abandoned but replaced by continuation-in-part applications Serial Nos. 27,469 and 27,967, now Patent No. 3,082,084, both filed May 9, 1960, by the same inventors.

According to the said application, products of the type described are prepared by processes comprising forming a coating of a compound of the bonding metal in an oxidized state around particles of the refractory metal oxide, the refractory oxide being in the form of substantially discrete particles having an average dimension of 5 to 500 millimicrons, dispersing the compound-coated refractory oxide particles in a molten salt, adding a reducing metal selected from the group consisting of alkali and alkaline earth metals in a proportion at least stoichiometrically equivalent to the oxidizing element of the coating, heating the mixture in the range from 400 to 1200° C. whereby the coating is reduced to the metal originally present as compound, and separating the resulting metal-coated refractory oxide particles as a powder from the other products of the reduction reaction and from the salt.

The foregoing process is particularly applicable with bonding metals having a melting point above 1200° C. and having an oxide with a free energy of formation at 27° C. of from 75 to 105 kilocalories per gram atom of oxygen in the oxide, such bonding metal being used in conjunction with a refractory metal oxide filler which is stable up to 1000° C. and has a melting point above 1000° C. and a free energy of formation at 1000° C. above about 100 kilocalories per gram atom of oxygen in the oxide. Such products are preferred bonders for ceramics in accordance with the processes of this invention.

When it is desired to include a non-bonding metal with a bonding metal in the processes of this invention, it is preferred to first disperse the refractory filler in the non-bonding metal (i.e., the "inactive" metal) and then dilute the inactive metal with the bonding metal. Processes for making such compositions, and the products obtained, are described and claimed in U.S. patent application Serial No. 734,624, filed May 12, 1958, by Guy B. Alexander, Ralph K. Iler, and Sherwood F. West, and issued February 21, 1961, as U.S. Patent 2,972,529.

An especially preferred embodiment of a process of the just-mentioned application, which is well adapted for making the ceramic bonders of the present invention, comprises preparing a colloidal dispersion of the refractory metal oxide filler particles, precipitating the discrete filler particles from the colloidal dispersion and simultaneously precipitating around them an insoluble, hydrous, oxygen-containing compound of the inactive metal by adding to a body of water, simultaneously but separately, a solution of a salt of the inactive metal, the colloidal dispersion of filler particles, and an alkali, removing the precipitate, drying it, reducing the hydrous, oxygen-containing compound of the inactive metal to the metal by passing over it a stream of hydrogen, and diluting the inactive metal with a bonding metal.

Effecting Contact Between the Bonder and the Ceramic

To make a novel product of the present invention the bonding metal containing the dispersed refractory oxide filler is brought into contact with the ceramic while the bonding metal is in the molten state. This can be accomplished in any of several ways: (a) The ceramic and the binder can be brought together with pressure, and then heated; (b) the binder can be melted and flowed in and around the ceramic; (c) the ceramic and the binder in the form of powders can be mixed and then hot-pressed; or (d) the ceramic can be forced against a heated mass of the binder. It is not necessary that the entire mass of metal bonder be in a molten condition. Surface melting or sintering is sufficient. Such methods of effecting contact usually involve the application of extreme pressure to the mixture of ceramic and bonder, and the bonder is usually in powdered form. Thus, in making cermets the powdered ceramic can be mixed with the powdered metal containing the dispersed refractory oxide. There may be no visible evidence of surface melting; it is sufficient if the temperature is raised to a point where plastic flow of the metal occurs under applied pressure.

Forming the Bond

After intimate contact of the ceramic and the bonder has been obtained in the manner above described, the bonding of the ceramic is effected by solidifying the bonding metal, as by cooling. It is not necessary, of course, to provide cooling means—the ceramic-bonder is merely permitted to return to ordinary temperatures whereupon the bonder metal solidifies and forms the bond.

The choice of procedure for solidifying will depend in part upon the proportion of bonding metal with respect to the ceramic. If this is relatively small, no precautions need be taken; but if it is relatively large, so that there is a molten mass of bonding metal containing the refractory filler and the ceramic, it may be necessary to provide means such as agitation during cooling to insure uniformity of the final product.

The Bonded Products

The bonded products consist of the ceramic material having a surface area of $6/d$ square meters per gram where $d$ is the density of the ceramic in grams per milliliter, the ceramic being bonded with the bonder metal containing the dispersed refractory oxide filler, the filler being in the form of substantially discrete particles 5 to 500 millimicrons in size. The products can have a wide variety of physical forms as will be evident from the discussion of the uses below.

The proportion of refractory oxide filler in the bonding metal can be from 0.05 to 20 volume percent. The proportion of filled bonding metal in the product can be varied widely, and will depend entirely upon the physical nature of the object being produced. For instance, when the filled bonding metal is used to join glass window panes to a metallic frame, its proportion in the final product will be extremely small—often less than 0.1 percent by weight of the total product. On the other hand, in making cermets having improved impact strength, the proportion of filled bonding metal can be relatively high, and is often in the range of 30 to 85 percent by volume.

Uses of the Bonded Products

In addition to the uses already mentioned in connection with the selection of the ceramic, the bonded products have a wide range of utility. Thus, they are useful in making new types of cermets having high strength. They can be used in making metal-to-glass seals, for example, in vacuum tube uses. More broadly, they can be used to make bonds or seals between two different types of ceramics, such as porcelain to glass, metals to ceramic, such as wire to glass, or for joining massive ceramic objects such as glass to glass.

In specific embodiments, for example, the refractory oxide-filled bonding metal can be used to join such materials as fiber glass or asbestos. In this way, laminates can be prepared, especially laminates using low-density metals such as aluminum or magnesium as the bonder. The products can be used for friction uses, as for example, in brake linings. The metal phase acts as a conductor to remove the heat from the braking area while the inorganic fibrous oxide material acts as a friction agent. In such instances, it is desirable to match as nearly as possible the coefficient of expansion of the filler with that of the metal.

The products of the invention can be in the form of superior electrical conductors. In this use, the refractory oxide filler can be, for instance, alumina at 2 volume percent in a mixture of a small proportion (as little as 0.1 percent) of magnesium as the bonder metal, alloyed with copper as an inactive metal. This conductor has strength and electrical conductivity at very high temperatures and can be used near the melting point of copper without losing its shape. The more oxide filler present in such compositions, the higher will be the useful temperature range, but the electrical conductivity will be correspondingly lower per unit volume.

Another example of the utility of the product of the invention is a solder consisting of an ordinary lead-tin solder modified with approximately 0.1 percent of calcium as the bonder metal, the calcium containing upwards of 5 percent silica as a filler. This solder has a high viscosity even at temperatures much above the melting point of the solder and can be handled like putty and worked at temperatures considerably above the melting point without loss of its shape. This solder can be used to bond ceramic objects, the bonded materials being products of the invention.

Examples

The invention will be better understood by reference to the following illustrative examples.

*Example 1.*—This example concerns the preparation of gas-tight, metal-ceramic seals, using a bonder metal containing a dispersed refractory oxide.

The bonder is a mixture of aluminum and magnesium metals and the refractory is thoria, the proportions by weight being $Al:Mg:ThO_2 = 61.2:33.0:5.8$, and is prepared by stirring colloidal thoria, having a surface area of 68 m.$^2$/g., into molten Al—Mg (65:35) under 0.02 percent oxygen (balance argon). This bonder composition is especially advantageous for joining ceramics to aluminum since the oxide coating normally present on the aluminum surface is readily wet by the molten binder and, therefore, need not be removed prior to the joining operation.

Aluminum is sealed to calcined alumina ceramic by first placing the aluminum and alumina in close proximity and then applying the molten bonder to the joint under a slightly oxidizing atmosphere. Cylinder-grade argon containing up to 200 p.p.m. of oxygen is satisfactory for this purpose. The joint prepared has improved high temperature strength and is sufficiently gas-tight for use in ceramic electronic tubes.

*Example 2.*—The preparation of a metal-glass seal is easily accomplished by placing the metal and glass to be bonded in close proximity ("grating contact") and then flowing a molten bonder, consisting of beryllia in lead containing magnesium, into the area to be joined, all operations being conducted in a mildly oxidizing atmosphere. Thus, Pyrex glassware can be sealed to zinc by flowing molten Pb-Mg-BeO (99.4:0.1:0.5) into the area to be joined under a 2 percent oxygen atmosphere (balance argon).

The resulting solidified zinc-to-glass bond has improved strength at elevated temperatures and is sufficiently gas-tight for use in closed systems such as those employed for transmission of gases.

The lead-magnesium-beryllia bonder was prepared by depositing lead oxide on beryllia (32 m.$^2$/g.), reducing the resulting mass in hydrogen while maintaining the temperature well below the melting point of lead, and thereafter adding the reduced mass to a lead-magnesium molten alloy.

*Example 3.*—Construction of a seal between Pyrex glassware parts is readily accomplished by the use of a refractory-filled bonder metal having the following composition by weight: Zn:Mg:ZrO$_2$=93:1.9:5.2. The bonder is prepared by stirring ZrO$_2$ (176 m.$^2$/g.) into molten Zn—Mg at 450–500°. To prepare the seal, the bonder is melted under a mildly oxidizing atmosphere (cylinder grade argon containing 200 p.p.m. of oxygen). The parts to be joined are dipped in the molten binder and while still held at 400°, the parts coated with the bonding metal are pressed together and allowed to cool.

*Example 4.*—A refractory-filled bonding composition useful for the preparation of glass-to-glass seals is the low melting composition Sn—Pb—Zn—Ca—ThO$_2$ (49.5:29.0:19.2:1.6:0.8), prepared by stirring ThO$_2$ (32 m.$^2$/g.) into the molten Sn—Pb—Zn—Ca. This binder is advantageous for the preparation of glass-to-glass seals.

*Example 5.*—Using the following technique, a nickel-chromium-5 percent thoria bonder composition was prepared, the chromium being the bonding metal:

A hydrous nickel oxide-chromium oxide-thoria precipitate was prepared by mixing ammonium carbonate solution with solutions of nickel nitrate and chromium nitrate and a sol of colloidal thoria. The precipitate was washed, dried, pulverized and heated with hydrogen to reduce the hydrous nickel and chromium oxides to the corresponding metals. In this way a powder containing 120 millimicron particles of thoria dispersed in the nickel-chromium mixture was prepared. The powder was compressed and heated to form a shaped mass of refractory-filled bonder metal.

This bonder was used to make a metal bond to an alumina ceramic surface. The Ni—Cr—ThO$_2$ composition, in the form of a ½ inch diameter slug, was placed on an alumina plate and both were placed in a furnace. Dry, pure hydrogen was passed through the furnace, and the furnace was heated to over 1400° C., whereupon the bonder melted and formed a strong bond on the surface of the alumina. The bond was so strong that, in trying to separate the alumina and the metal, the alumina plate was broken, and fragments thereof remained welded to the metal.

I claim:

1. In a process for producing metal-bonded ceramics the steps comprising dispersing in a bonding metal a particulate refractory metal oxide insoluble therein, the bonding metal being one which has an oxide with a free energy of formation at 27° C. greater than 75 kilocalories per gram atom of oxygen in the oxide, and the particulate refractory oxide having a free energy of formation greater than that of said bonding metal oxide, a melting point higher than that of the bonding metal, being present in the bonding metal in the proportion of 0.05 to 20 volume percent, being in the form of substantially discrete particles 5 to 500 millimicrons in size, and being dispersed in the bonding metal so that substantially all of the individual refractory oxide particles are each surrounded by at least a film of fused bonding metal, effecting contact between the refractory oxide-filled bonding metal, in the molten state, and a ceramic material having a surface area less than $6/d$ square meters per gram, $d$ being the density of the ceramic in grams per milliliter, and solidifying the metal while maintaining such contact.

2. A process of claim 1 in which the ceramic is in powdered form, whereby the product obtained is a cermet.

3. A process of claim 1 wherein there is brought into contact with the molten bonding metal another metal in the solid state, whereby bonding of said other metal to the ceramic is effected.

4. A process of claim 1 in which there is present with the molten bonding metal another molten metal which is a non-bonding metal having an oxide with a free energy of formation at 27° C. less than 75 kilocalories per gram atom of oxygen in the oxide.

5. An article comprising a ceramic material having a surface area less than $6/d$ square meters per gram, $d$ being the density of the ceramic in grams per milliliter, bonded to a bonding metal in which there is dispersed a particulate refractory metal oxide insoluble therein, the bonding metal being one which has an oxide with a free energy of formation at 27° C. greater than 75 kilocalories per gram atom of oxygen in the oxide, and the particulate refractory oxide having a free energy of formation greater than that of said bonding metal oxide, a melting point higher than that of the bonding metal, being present in the bonding metal in the proportion of 0.05 to 20 volume percent, being in the form of substantially discrete particles 5 to 500 millimicrons in size, and being dispersed in the bonding metal so that substantially all of the individual refractory oxide particles are each surrounded by at least a film of fused bonding metal.

6. An article of claim 5 in which the ceramic is in powdered form, the article being a cermet.

7. An article of claim 5 in which the ceramic-bonder metal is also bonded to another metal object.

8. An article of claim 5 in which there is homogeneously mixed with the bonding metal another metal which is a non-bonding metal having an oxide with a free energy of formation at 27° C. less than 75 kilocalories per gram atom of oxygen in the oxide.

References Cited in the file of this patent

UNITED STATES PATENTS

| | | |
|---|---|---|
| 2,449,759 | Barschdorf | Sept. 21, 1948 |
| 2,564,738 | Tank | Aug. 21, 1951 |
| 2,647,070 | Litton | July 28, 1953 |
| 2,773,570 | Mihran et al. | Dec. 11, 1956 |
| 2,775,531 | Montgomery et al. | Dec. 25, 1956 |
| 2,826,541 | Barr et al. | Mar. 11, 1958 |
| 2,836,885 | Macdonald et al. | June 3, 1958 |
| 2,848,802 | Luks | Aug. 26, 1958 |
| 2,928,755 | Brandstadt et al. | Mar. 15, 1960 |